(12) United States Patent
Koyama (10) Patent No.: US 9,359,077 B2
(45) Date of Patent: Jun. 7, 2016

(54) AIRCRAFT LAVATORY UNIT AND STRUCTURE FOR ARRANGING SAME

(71) Applicant: The Yokohama Rubber Co., LTD., Minato-ku, Tokyo (JP)

(72) Inventor: Takashi Koyama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 25 days.

(21) Appl. No.: 14/400,519

(22) PCT Filed: May 8, 2013

(86) PCT No.: PCT/JP2013/002954
§ 371 (c)(1),
(2) Date: Nov. 11, 2014

(87) PCT Pub. No.: WO2013/168417
PCT Pub. Date: Nov. 14, 2013

(65) Prior Publication Data
US 2015/0129717 A1    May 14, 2015

(30) Foreign Application Priority Data

May 11, 2012  (JP) ................. 2012-109126

(51) Int. Cl.
*B64D 11/02* (2006.01)
*E03D 1/00* (2006.01)
*B64D 11/00* (2006.01)
(Continued)

(52) U.S. Cl.
CPC .............. *B64D 11/02* (2013.01); *B64D 11/003* (2013.01); *B64D 11/06* (2013.01); *E03C 1/01* (2013.01); *E03D 1/003* (2013.01)

(58) Field of Classification Search
CPC ...... B64D 11/02; B64D 11/06; B64D 11/003; E03D 1/003; E03C 1/01
See application file for complete search history.

(56) References Cited

U.S. PATENT DOCUMENTS 6,079,669 A * 6/2000 Hanay ................ B64D 11/02
244/118.5
6,615,421 B2 * 9/2003 Itakura .................. B64D 11/02
244/118.5
(Continued)

FOREIGN PATENT DOCUMENTS

DE    10 2006 029 800    12/2007
DE    10 2007 018 911    10/2008
(Continued)

OTHER PUBLICATIONS

International Search Report for International Application No. PCT/JP2013/002954 dated Aug. 13, 2013, 2 pages, Japan.

*Primary Examiner* — Valentina Xavier
(74) *Attorney, Agent, or Firm* — Thorpe North & Western (57) ABSTRACT

Provided are an aircraft lavatory unit and a structure for arranging the same. A space section of a uniform width extends in a straight line from a rear wall to a front wall between a first side wall and a second side wall. A toilet bowl is disposed near the end in the extending direction of the space section on a side with the rear wall. A storage box is disposed above the toilet bowl between the toilet bowl and the rear wall. A wash basin is provided on a top surface of the storage box. The width of the body frame where the second side wall is located is formed at the minimum dimensions sufficient to ensure that the space section is wide enough that a person can come and go between the doorway and the toilet bowl and sit on the toilet bowl.

20 Claims, 8 Drawing Sheets

(51) Int. Cl.
*B64D 11/06* (2006.01)
*E03C 1/01* (2006.01)

(56) References Cited

U.S. PATENT DOCUMENTS

| | | | | |
|---|---|---|---|---|
| D593,645 S | * | 6/2009 | Bock | D23/271 |
| 8,590,838 B2 | * | 11/2013 | Cook | B64D 11/02 114/116 |
| D701,948 S | * | 4/2014 | Schliwa | D23/274 |
| 8,925,862 B2 | * | 1/2015 | Ehlers | B64D 11/02 244/118.5 |
| 8,991,947 B2 | * | 3/2015 | Lee | B64D 47/00 312/242 |
| 9,045,230 B2 | * | 6/2015 | Burrows | B64D 11/02 |
| 2008/0179456 A1 | | 7/2008 | Diergardt | |
| 2009/0050738 A1 | | 2/2009 | Breuer et al. | |
| 2009/0261200 A1 | | 10/2009 | Saint-Jalmes et al. | |
| 2009/0283636 A1 | | 11/2009 | Saint-Jalmes et al. | |
| 2011/0139930 A1 | * | 6/2011 | Sutthoff | B64D 11/02 244/118.5 |
| 2011/0253835 A1 | * | 10/2011 | Cook | B64D 11/02 244/118.5 |
| 2012/0248245 A1 | | 10/2012 | Schliwa | |
| 2012/0325964 A1 | * | 12/2012 | Hawkins | B64D 11/02 244/118.6 |
| 2013/0206905 A1 | * | 8/2013 | Savian | B64D 11/003 244/118.5 |
| 2014/0158825 A1 | | 6/2014 | Cook et al. | |
| 2014/0196206 A1 | * | 7/2014 | Savian | B64D 11/02 4/664 |
| 2014/0224930 A1 | * | 8/2014 | Ivester | B64D 11/04 244/118.5 |
| 2015/0166180 A1 | * | 6/2015 | Schliwa | B61D 35/005 244/118.5 |
| 2015/0239563 A1 | | 8/2015 | Cook et al. | |
| 2015/0239564 A1 | | 8/2015 | Cook et al. | |
| 2015/0298809 A1 | * | 10/2015 | Minegishi | B64D 11/02 244/118.5 |
| 2015/0298810 A1 | * | 10/2015 | Koyama | B64D 11/02 244/118.5 |

FOREIGN PATENT DOCUMENTS

| | | |
|---|---|---|
| FR | 2 929 244 | 10/2009 |
| JP | S50-044449 | 5/1975 |
| JP | H06-040399 | 2/1994 |
| JP | 3637744 | 4/2005 |
| JP | 2005-330687 | 12/2005 |
| JP | 2008-006915 | 1/2008 |
| WO | WO 2010/108775 | 9/2010 |
| WO | WO 2011/133576 | 10/2011 |

* cited by examiner

AIRCRAFT LAVATORY UNIT AND STRUCTURE FOR ARRANGING SAME

TECHNICAL FIELD

The present technology relates to an aircraft lavatory unit and a structure for arranging the same.

BACKGROUND

A plurality of seats, a plurality of lavatory units, a plurality of galleys, and so forth are disposed in the limited space within the fuselage of an aircraft.

Various proposals have been made for the sake of increasing the number of seats.

For example, US Patent Publication Nos. 2008/0179456 A1 and 2009/0283636 A1 disclose movable aircraft lavatory units, and propose aircraft lavatory units whose layouts can be altered.

However, even if the layout of aircraft lavatory units is altered, there is no change in the area occupied by the aircraft lavatory units, creating limits to the extent to which the number of seats can be increased.

Meanwhile, within the aircraft lavatory unit, pressurized water is conveyed to the aircraft lavatory unit via piping, and a washing lever is operated in order to open a valve and allow the pressurized water to flow into the toilet bowl, with no dedicated toilet cistern being provided behind the toilet bowl.

In addition, the aircraft lavatory unit, in many cases, will include a wash basin, but simply disposing the wash basin therein will increase the width of the aircraft lavatory unit, which is disadvantageous when attempting to increase the number of seats.

SUMMARY

The present technology has been devised in view of the circumstances described above, and provides an aircraft lavatory unit and an arrangement structure therefor that are advantageous in increasing the number of seats.

An aircraft lavatory unit according to an example of the present technology is characterized in being provided with a body frame including: a bottom wall that is rectangular as seen in plan view; a first side wall and a second side wall that rise from long sides of the bottom wall facing each other in parallel; a rear wall that rises from one short side of the bottom wall and connects the side walls at one end; and a front wall that rises from another short side of the bottom wall and connects the side walls at another end; wherein: the second side wall rises at least to a greater height than that of a backrest of an aircraft seat in an upright position; a space section of a uniform width extending in a straight line from the rear wall to the front wall is formed between the first side wall and the second side wall; a lavatory is formed by disposing a toilet bowl and a wash basin in the space section; a doorway is disposed in the front wall; the toilet bowl is disposed near an end in the extending direction of the space section on the side with the rear wall; a storage box is disposed above the toilet bowl between the toilet bowl and the rear wall; the wash basin is disposed in the upper part of the storage box; and the width of the body frame where the second side wall is located is formed at the minimum dimensions sufficient to ensure that the space section is wide enough for a person to be able to come and go between the doorway and the toilet bowl and sit on the toilet bowl.

In addition, in an example arrangement structure for the aircraft lavatory unit according to the present technology, a fuselage of an aircraft is provided with: a longitudinal aisle extending in a longitudinal direction of the fuselage; seat groups in which a plurality of seat rows, the seat rows comprising a plurality of seats facing the front of the fuselage and arranged in rows along a latitudinal direction of the fuselage, are arranged in rows along the longitudinal direction of the fuselage on left and right sides of the longitudinal aisle; and a latitudinal aisle extending in the latitudinal direction from boarding entrances behind the seat groups and connecting with the longitudinal aisle; and, the aircraft lavatory unit is disposed so that the second side wall is located adjacent to the backrest of each of the seats of a rear seat row located farthest to the rear in at least one of the seat groups on the left and right sides of the longitudinal aisle, the first side wall is located facing the latitudinal aisle, and the front wall is located facing the longitudinal aisle.

In the aircraft lavatory unit according to the present technology, the toilet bowl and the width-occupying wash basin are disposed in a row along the extending direction of the space section at an end in the extending direction of the space section on the side with the rear wall.

As such, the width of the body frame from the doorway to the toilet bowl can be formed at the minimum dimensions sufficient to ensure that the space section is wide enough that a person can come and go and sit on the toilet bowl, without the need to consider the width of the wash basin.

It is thus possible to form the aircraft lavatory unit in a rectangular shape extending a uniform width in a straight line, as seen in plan view, to at least a greater height than that of a backrest of an aircraft seat in an upright position, which is advantageous in reducing the area occupied by the aircraft lavatory unit on the floor within the aircraft and increasing the number of seats within the aircraft.

In addition, according to the arrangement structure for the aircraft lavatory unit of the present technology, the aircraft lavatory unit is disposed so that the second side wall is disposed adjacent to the backrest of each of the seats in a rear seat row, the first side wall is disposed facing the latitudinal aisle, and the front wall is disposed facing the longitudinal aisle.

Thus, because the width of the body frame with respect to the longitudinal direction of the fuselage where the second side wall is located is formed at the minimum dimensions sufficient to ensure that the space section is wide enough for a person to come and go and sit on the toilet bowl, the aircraft lavatory unit occupies very little space behind the rear seat row with respect to the longitudinal direction of the fuselage.

It is thus possible to increase the number of seat rows in front of the second side wall on the sides of the longitudinal aisle by decreasing the space between seat rows with respect to the longitudinal direction of the fuselage by a few inches, such as one or two inches.

DETAILED DESCRIPTION

First Embodiment

Next, an aircraft lavatory unit according to an embodiment of the present technology and an arrangement structure therefor will be described with reference to the drawings.

Figure 1:
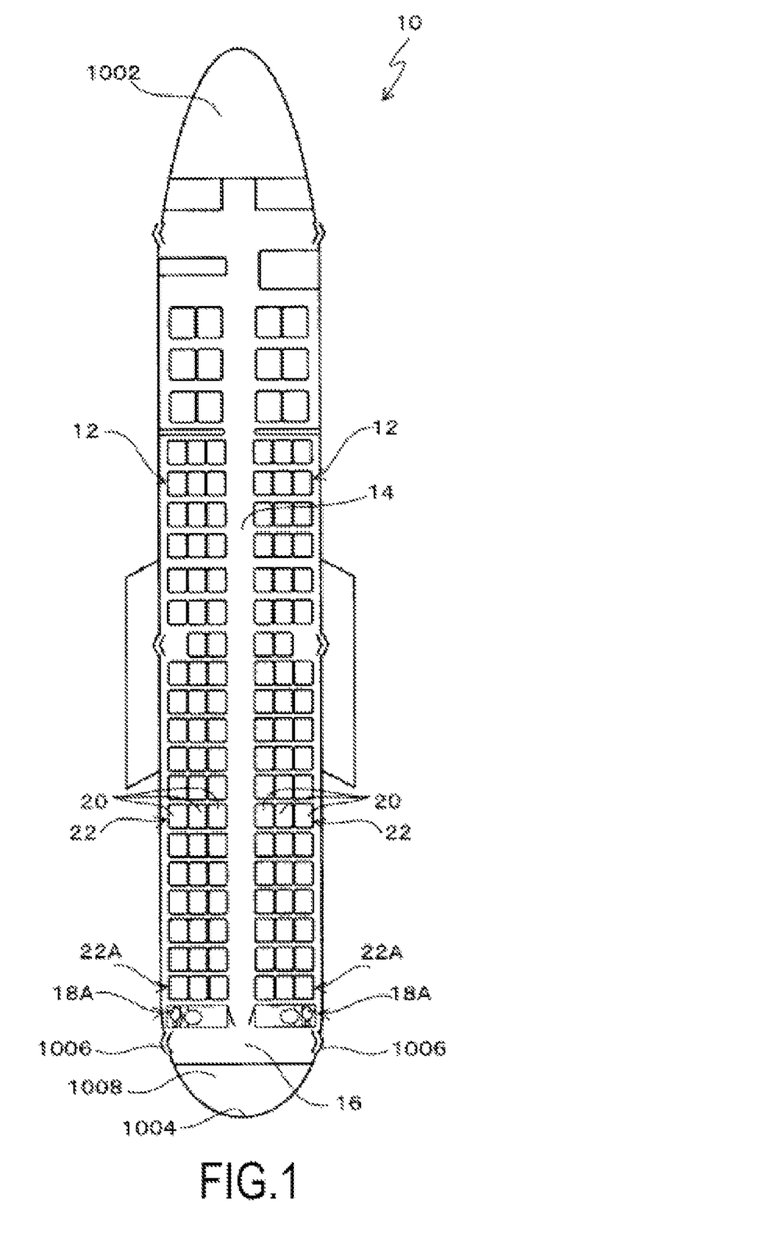
FIG. 1 is an explanatory view illustrating an interior layout of an aircraft according to a first embodiment.

As illustrated in FIG. 1, an aircraft fuselage 10 is provided with seat groups 12, a longitudinal aisle 14, a latitudinal aisle 16, and aircraft lavatory units 18A.

A cockpit 1002 constitutes the front part of the fuselage 10 of the aircraft, and a pressure bulkhead 1004 constitutes the rear part thereof. Between the front and rear parts are provided the seat groups 12, longitudinal aisle 14, latitudinal aisle 16, and aircraft lavatory units 18A. In the drawings, 1006 is a rear boarding entrance, and 1008 is a galley.

The longitudinal aisle 14 extends along the center of the fuselage 10 in the longitudinal direction of the fuselage 10.

The seat groups 12 are provided on left and right sides of the longitudinal aisle 14, respectively.

The seat groups 12 are each constituted by a plurality of seat rows 22 arranged in rows along the longitudinal direction of the fuselage 10, the seat rows 22 including a plurality of seats 20 facing the front of the fuselage 10 and arranged in rows along the latitudinal direction of the fuselage 10. In the present embodiment, the seat rows 22 are each constituted by three seats 20 arranged in a row along the latitudinal direction.

The seats 20 are each provided with reclining functionality, and backrests 2002 thereof (see FIG. 7) are configured to be adjustable between an upright position and a reclining position.

The latitudinal aisle 16 extends in the latitudinal direction from boarding entrances 1006 of the fuselage 10 behind the seat groups 12, and connects with the longitudinal aisle 14.

The aircraft lavatory units 18A are provided on the floor of the fuselage 10 between rear seat rows 22A located farthest to the rear of their respective seat groups 12 and the latitudinal aisle 16.

Next, the composition of the aircraft lavatory unit 18A will be described with reference to FIGS. 3 to 7.

Figure 3:
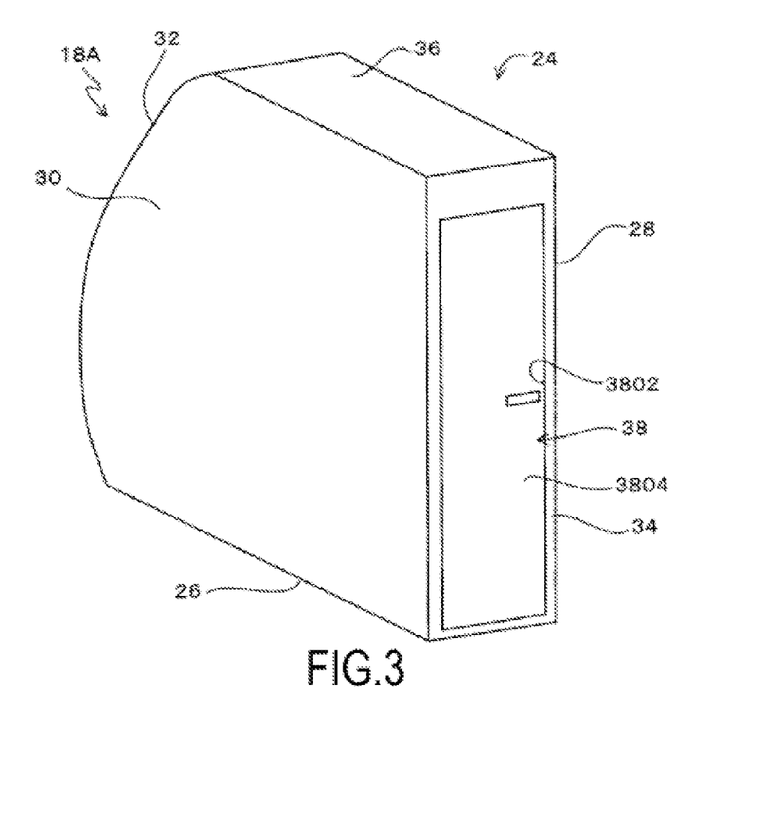
FIG. 3 is a perspective view of an aircraft lavatory unit according to the first embodiment.
Figure 4:
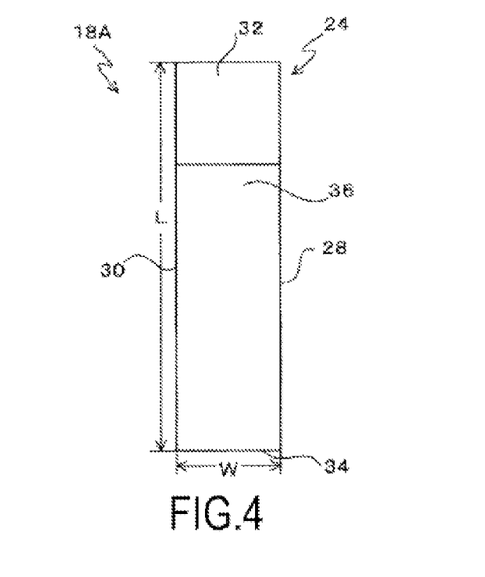
FIG. 4 is a plan view of the aircraft lavatory unit according to the first embodiment.
Figure 5:
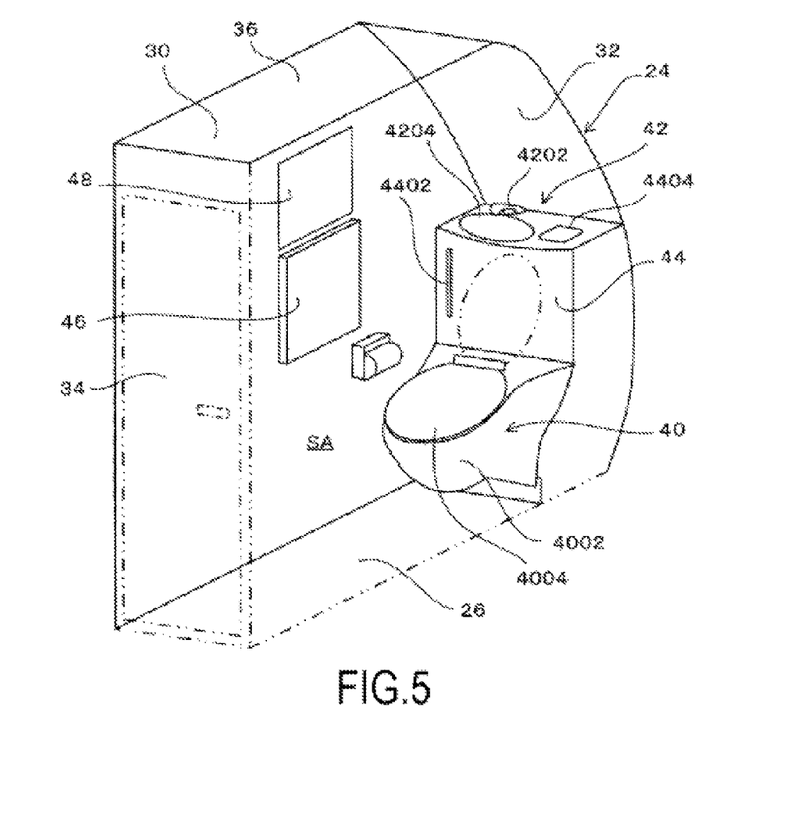
FIG. 5 is an exploded perspective view of the aircraft lavatory unit according to the first embodiment.

A body frame 24 of the aircraft lavatory unit 18A comprises a bottom wall 26, a first side wall 28, a second side wall 30, a rear wall 32, a front wall 34, and a ceiling wall 36.

The bottom wall 26 exhibits a rectangular shape as seen in plan view.

The first side wall 28 rises from one long side of the bottom wall 26 and connects to the ceiling wall 36.

The second side wall 30 rises from another long side of the bottom wall 26 to at least a greater height than that of the backrests 2002 of the aircraft seats 20 in the upright position, and, in the present embodiment, extends from the bottom wall 26 to the ceiling wall 36.

The first side wall 28 and the second side wall 30 are both formed as flat surfaces, and are disposed in parallel to each other.

The rear wall 32 rises from one short side of the bottom wall 26 and connects the first side wall 28 and the second side wall 30 at one end. Because the aircraft lavatory unit 18A is disposed near a side wall within the aircraft, the rear wall 32 is formed as a curved surface corresponding to the side wall of the fuselage, the shape being determined by that of the side wall of the fuselage in which the aircraft lavatory unit is installed.

The front wall 34 rises from another short side of the bottom wall 26 and connects the first side wall 28 and the second side wall 30 at another end. A doorway 38 is provided in the front wall 34. The doorway 38 comprises an opening 3802 provided in the front wall 34, and a door 3804 that opens and closes off the opening 3802.

Figure 2:
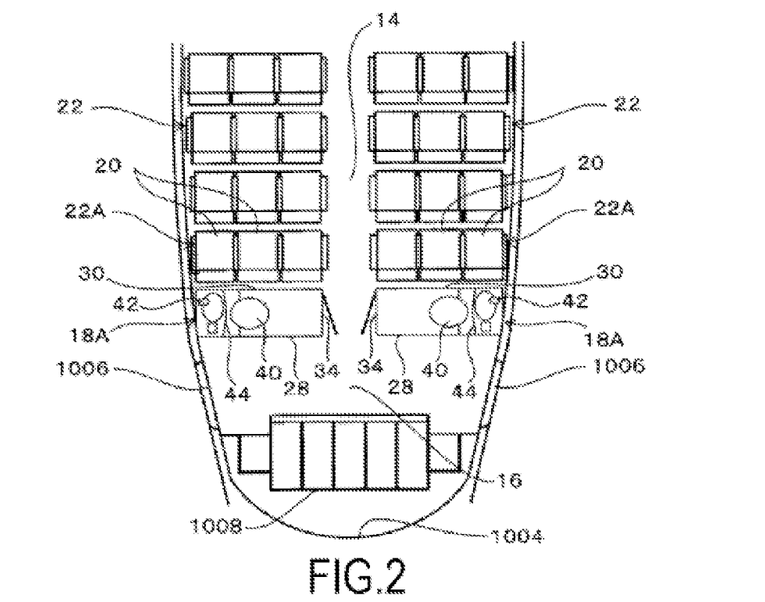
FIG. 2 is a magnified view of the layout of main parts within an aircraft according to the first embodiment.

In the present embodiment, the length L of the body frame 24 in a direction linking the rear wall 32 and the front wall 34 (see FIG. 4) is equal to or less than the sum of the widths of the three seats 20, i.e., equal to or less than the length of the seat rows 22, as illustrated in FIGS. 1 and 2. Note that the length L will vary according to the number of seats, the size of the seats 20, and the disposition of the seats 20, but is preferably as small as possible in order to ensure greater space in the aircraft.

A space section SA of a uniform width extends a larger dimension than the width in a straight line from the rear wall 32 to the front wall 34 between the first side wall 28 and the second side wall 30.

Figure 6:
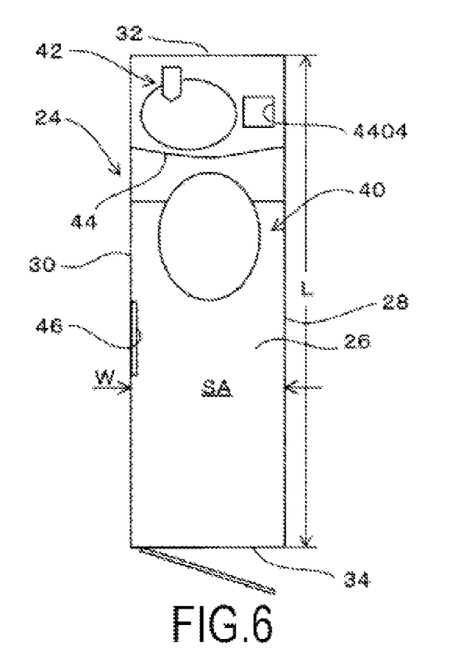
FIG. 6 is a plan view of the interior of a lavatory of the aircraft lavatory unit according to the first embodiment.

Furthermore, a toilet bowl 40, wash basin 42, and storage box 44 are disposed in the space section SA to form a lavatory.

The toilet bowl 40 is disposed near the end in the extending direction of the space section SA on the side with the rear wall 32. The toilet bowl 40 comprises a toilet seat 4002, and a lid 4004 that covers the toilet seat 4002 in a lowered position and leaves the toilet seat 4002 open in a raised position.

The storage box 44 is disposed above the toilet bowl 40 between the toilet bowl 40 and the rear wall 32.

The storage box 44 extends across the entire span between the first side wall 28 and the second side wall 30, and houses a waste receptacle and a dispenser for toilet seat covers.

The storage box 44 has a front surface facing the front wall 34, and a toilet seat cover dispensing mouth 4402 is provided at a location on the front surface located beside the lid 4004 in the raised position.

The arrangement structure for the storage box 44 is unique to the aircraft lavatory unit 18A, which is made possible by the fact that, within aircraft, pressurized water is guided to the aircraft lavatory unit 18A via piping, with no dedicated toilet cistern being provided.

The top surface of the storage box 44 is located at a location above the lid 4004 in the raised position, and the wash basin 42 and a waste disposal chute 4404 leading to the waste receptacle are provided on the top surface of the storage box 44.

That is, the toilet bowl 40 and the width-occupying wash basin 42 are disposed in a row along the extending direction of the space section SA at an end in the extending direction. The wash basin 42 comprises a tap 4202 and a bowl 4204.

In the present embodiment, a storage box 46 housing various supplies for the lavatory and a mirror 48 are further disposed on the inner surface of the second side wall 30 located within the lavatory.

Figure 7:
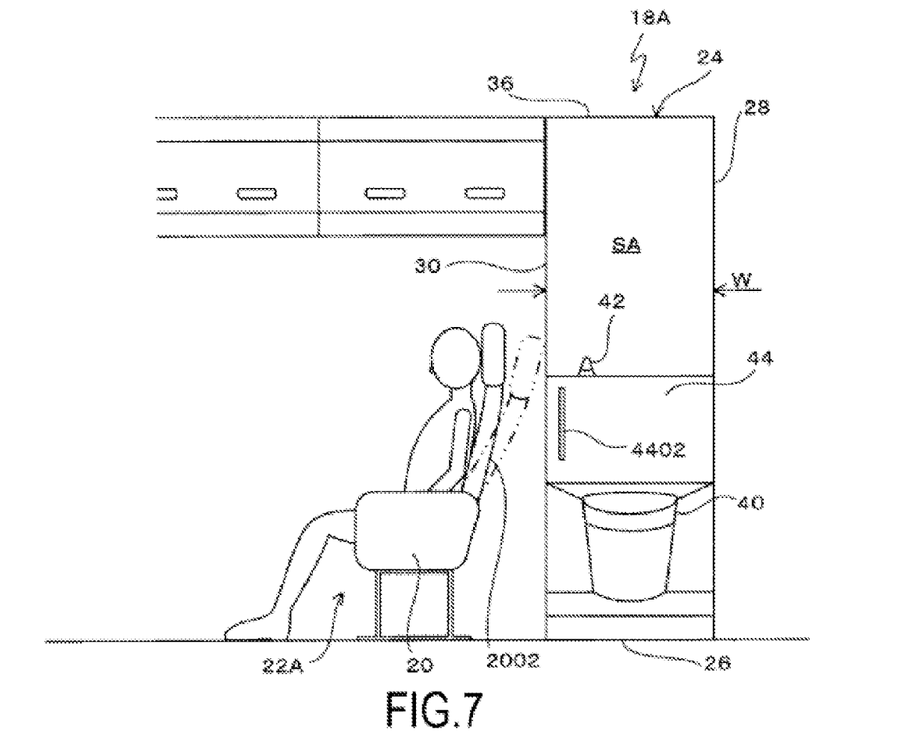
FIG. 7 is a side view showing the relationship between the aircraft lavatory unit according to the first embodiment installed within an aircraft, and a rear seat row.

As illustrated in FIG. 7, the width W of the body frame 24 where the second side wall 30 is exposed to the outside of the body frame 24 is located is formed at the minimum dimensions sufficient to ensure that the space section SA is wide enough that a person can come and go between the doorway 38 and the toilet bowl 40 and sit on the toilet seat 4002 of the toilet bowl 40.

Specifically, the width W is from 600 mm to 750 mm.

In the present embodiment, the toilet bowl 40 and the width-occupying wash basin 42 are disposed in a row along the extending direction of the space section SA at an end of the extending direction of the space section SA. That is, if the wash basin 42 were disposed on the side with the doorway 38 of the space section SA or at the center in the extending direction of the space section SA, the width W of the aircraft lavatory unit 18A would be increased by that amount. However, disposing the toilet bowl 40 near an end of the space section SA and disposing the wash basin 42 therebehind via the storage box 44, as in the case of the present embodiment, the wash basin 42 can be disposed without increasing the width of the space section SA, allowing the wash basin 42 to fit within the width of the space section SA.

As a result, the width W of the body frame 24 from the doorway 38 to the toilet bowl 40 can be formed at the minimum dimensions sufficient to ensure that the space section SA is wide enough for a person to come and go and sit on the toilet bowl 40, without the need to consider the width of the wash basin 42.

Thus, as illustrated in FIG. 4, it is possible to form the aircraft lavatory unit 18A in a rectangular shape, as seen in plan view, having the small uniform width W, extending the length L in a straight line, and rising to at least a greater height than that of the backrests 2002 of the aircraft seats 20 in the upright position, allowing the aircraft lavatory unit 18A to be made more slim and smaller, which is advantageous in reducing the area occupied by the aircraft lavatory unit 18A on the floor within the aircraft and increasing the number of seats within the aircraft.

In addition, the storage box 44 housing the waste receptacle and the dispenser for toilet seat covers serves as a member for ensuring the height of the wash basin 42, which is also advantageous in making effective use of the narrow space within the aircraft lavatory unit 18A.

Furthermore, the aircraft lavatory units 18A configured as described above are installed within the aircraft in the following manner.

As illustrated in FIGS. 2 and 7, the aircraft lavatory unit 18A is disposed so that the second side wall 30 is located adjacent to the backrest 2002 of each of the seats 20 of the rear seat rows 22A, the first side wall 28 faces the latitudinal aisle 16, and the front wall 34 faces the longitudinal aisle 14.

More specifically, as illustrated in FIG. 7, the aircraft lavatory unit 18A is disposed behind the backrests 2002 of the seats 20 of each of the rear seat rows 22A so as to ensure the minimum space necessary for passengers to make full use of the reclining functionality of the seats 20, with the second side wall 30 disposed adjacent to the backrests 2002 of the seats 20 of each of the rear seat rows 22A in the reclining position.

As such, because the width W of the body frame 24 with respect to the longitudinal direction of the fuselage 10 where the second side wall 30 is located is formed at the minimum dimensions sufficient to ensure that the space section SA is wide enough for a person to come and go between the doorway 38 and the toilet bowl 40 and sit on the toilet bowl 40, when the aircraft lavatory unit 18A is disposed so that the second side wall 30 is located adjacent to the backrests 2002 of the seats 20 of the rear seat rows 22A, the aircraft lavatory unit 18A will occupy very little space behind the rear seat rows 22A with respect to the longitudinal direction of the fuselage.

Figure 12:
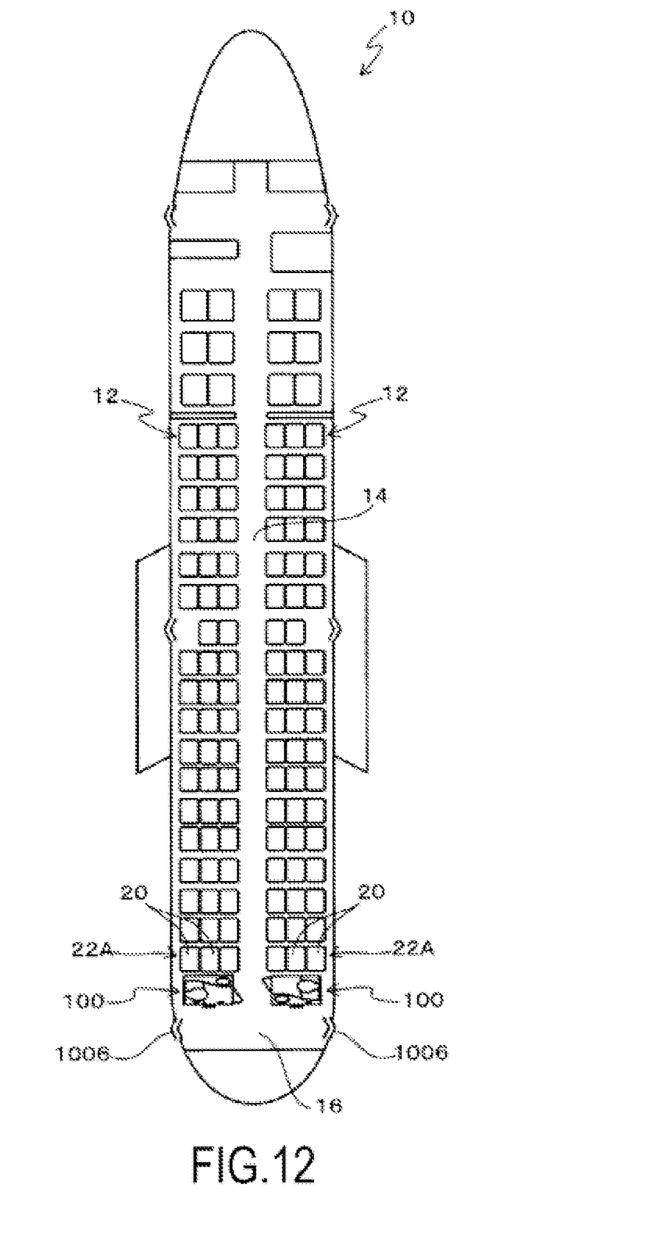
FIG. 12 is an explanatory view illustrating a comparative example of an interior layout of an aircraft.

As such, the number of seat rows 22 in front of the second side walls 30 on both sides of the longitudinal aisle 14 can be increased by decreasing the space between the seat rows 22 with respect to the longitudinal direction of the fuselage 10 by a few inches, such as one or two inches, the number of seats 20 can be increased by a total of six over the comparative example illustrated in FIG. 12, in which aircraft lavatory units 100 having square shapes as seen in plan view, the units having wash basins disposed between the two side walls thereof, are disposed behind the rear seat rows 22A.

Thus, in accordance with the present embodiment, an aircraft lavatory unit and arrangement structure therefor that are advantageous in increasing the number of seats are yielded.

Second Embodiment

Figure 8:
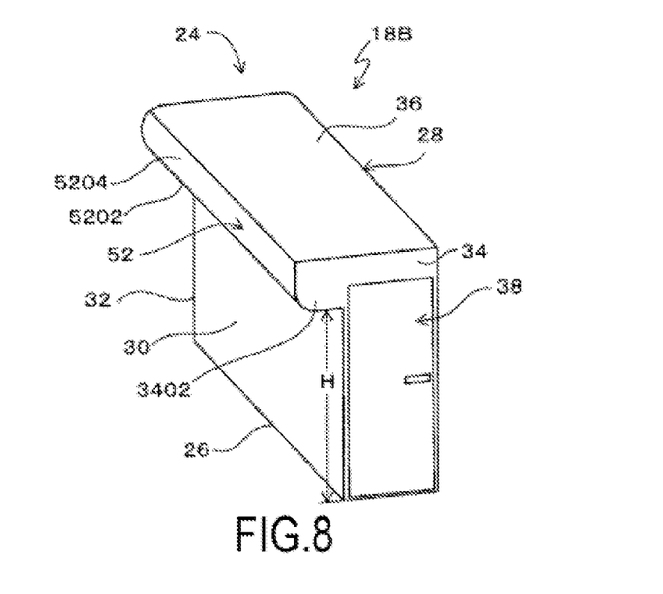
FIG. 8 is a perspective view of an aircraft lavatory unit according to a second embodiment.

Next, a second embodiment will be described with reference to FIGS. 8 and 9. Note that, in the embodiment described hereafter, only those points differing from the first embodiment will be described, and description of points similar to the first embodiment will be omitted.

In an aircraft lavatory unit 18B according to the second embodiment, the second side wall 30 does not extend to the ceiling wall 36, but rather rises to a height H that is greater than that of the backrests 2002 of the aircraft seats 20 in the upright position.

In this case, the height H that is greater than that of the backrests 2002 of the aircraft seats 20 in the upright position indicates a height from the floor of the fuselage 10, or from the undersurface of the bottom wall 26 of the aircraft lavatory unit 18B.

Figure 9:
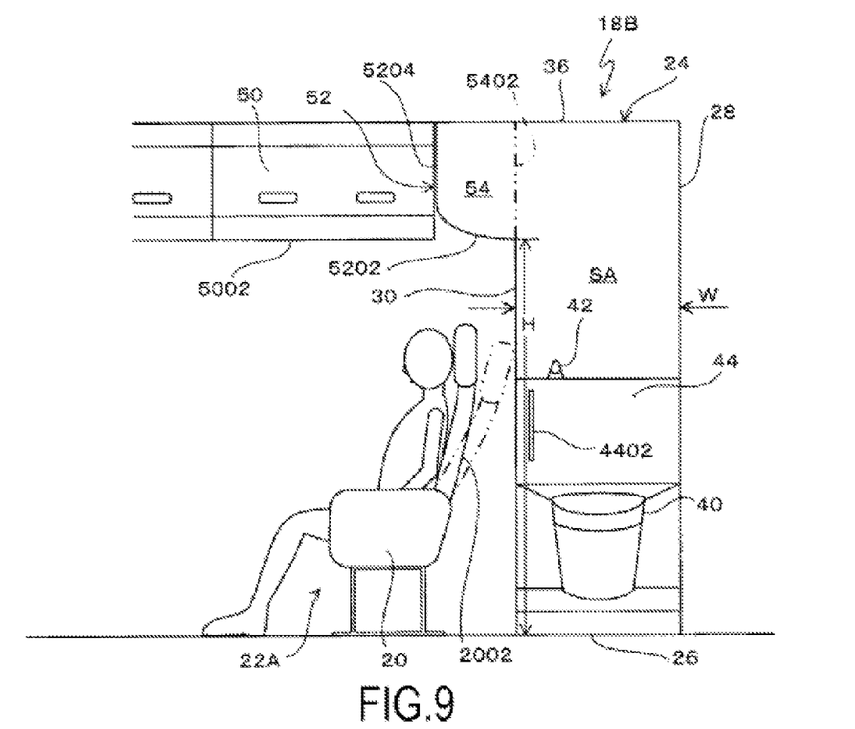
FIG. 9 is a side view showing the relationship between the aircraft lavatory unit according to the second embodiment installed within an aircraft, and a rear seat row.

As illustrated in FIG. 9, the height H is such that, even if there is a projection at height H, the projection is located over and will not come into contact with the head of a passenger seated in the aircraft seat 20 when the backrest 2002 is in the upright position, and the passenger's head will not come into contact with the projection when the passenger is taking his or her seat in the aircraft seat 20 or gets up from the aircraft seat 20.

Specifically, the height H is in a range from 150 to 170 cm.

Having the height H be the same as that of an undersurface 5002 of a luggage compartment 50 provided in an upper part of a side wall of the fuselage 10 is advantageous in improving the design of the interior of the aircraft.

The aircraft lavatory unit 18B according to the second embodiment is provided with a projecting wall section 52 projecting from an upper end of the second side wall 30 in a direction away from the first side wall 28 and connected to the ceiling wall 36, the rear wall 32, and the front wall 34.

The projecting wall section 52 comprises an undersurface section 5202 rising from an upper end of the second side wall 30 in a direction away from the first side wall 28, and a side wall section 5204 curves from the undersurface section 5202 and extends in parallel to the first side wall 28, and a projecting section 3402 corresponding to the projecting wall section 5202 is provided on the front wall 34.

A lavatory storage shelf 54 for storing lavatory supplies is formed at a location within the projecting wall section 52. Note that an imaginary line 5402 in FIG. 9 indicates a wall surface dividing the lavatory from the storage shelf 54; this wall surface is, for example, a surface of a removable panel or a surface of an openable and closable door.

The height H of the undersurface section 5202 of the projecting wall section 52 is the same as the height H of the second side wall 30, specifically in a range from 150 to 170 cm. As illustrated in FIG. 9, having this height H be the same as that of the undersurface 5002 of the luggage compartment 50 provided on an upper part of the side wall of the fuselage 10 is advantageous in improving the design of the interior of the aircraft.

The same effects as the first embodiment are also exhibited by the second embodiment.

Specifically, in the aircraft lavatory unit 18B according to the second embodiment as well, it is possible to form the body frame 24 in a rectangular shape having the small uniform width W, extending the length L in a straight line, and rising to the height H greater than that of the backrests 2002 of the aircraft seats 20 in the upright position, allowing the aircraft lavatory unit 18B to be made more slim and smaller, which is advantageous in reducing the area occupied by the aircraft lavatory unit 18B on the floor within the aircraft and increasing the number of seats within the aircraft.

Furthermore, in an arrangement structure for the aircraft lavatory unit 18B according to the second embodiment, the width W of the body frame 24 where the second side wall 30 is located is set to the minimum dimensions sufficient to ensure that the space section SA is wide enough for a person to come and go between the doorway 38 and the toilet bowl 40 and sit on the toilet bowl 40, as illustrated in FIG. 9, with the result that, when the aircraft lavatory unit 18B is disposed so that the second side wall 30 is located adjacent to the backrests 2002 of the seats 20 of the rear seat rows 22A, the aircraft lavatory unit 18B occupies very little space behind the rear seat rows 22A with respect to the longitudinal direction of the fuselage, which is advantageous in increasing the number of seats.

In addition, in accordance with the second embodiment, the aircraft lavatory unit 18B is provided with the lavatory storage shelf 54, which is advantageous in increasing the convenience of the lavatory.

Third Embodiment

Figure 10:
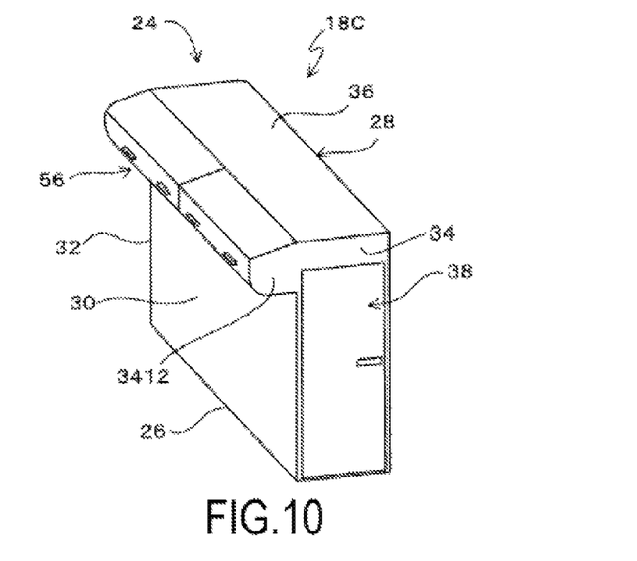
FIG. 10 is a perspective view of an aircraft lavatory unit according to a third embodiment.

Next, a third embodiment will be described with reference to FIGS. 10 and 11.

In an aircraft lavatory unit 18C according to the third embodiment, the second side wall 30 extends from the bottom wall 26 to the ceiling wall 36, as in the first embodiment.

In the third embodiment, a luggage compartment 56 for storing luggage from the passenger cabin side is provided at a location at a height H that is greater than that of the backrests 2002 of the aircraft seats 20 in the upright position on an outer surface located on the reverse side of the space section SA on an upper part of the second side wall 30.

A projecting section 3412 corresponding to the luggage compartment 56 is provided on the front wall 34.

The luggage compartment 56 is formed at the same height H as the luggage compartment 50 provided on the upper part of the side wall of the fuselage 10 and in the same shape as the luggage compartment 50, which is advantageous in improving the design of the interior of the aircraft. The height H of the luggage compartment 56 is defined similarly to the height of the second side wall 30 and the height H of the undersurface 5002 of the luggage compartment 50 in the second embodiment.

The same effects as the first embodiment are also exhibited by the third embodiment.

Specifically, in the aircraft lavatory unit 18C according to the third embodiment as well, it is possible to form the body frame 24 in a rectangular shape having the small uniform width W, extending the length L in a straight line, and rising to the height H greater than that of the backrests 2002 of the aircraft seats 20 in the upright position, allowing the aircraft lavatory unit 18C to be made more slim and smaller, which is advantageous in reducing the area occupied by the aircraft lavatory unit 18C on the floor within the aircraft and increasing the number of seats within the aircraft.

Figure 11:
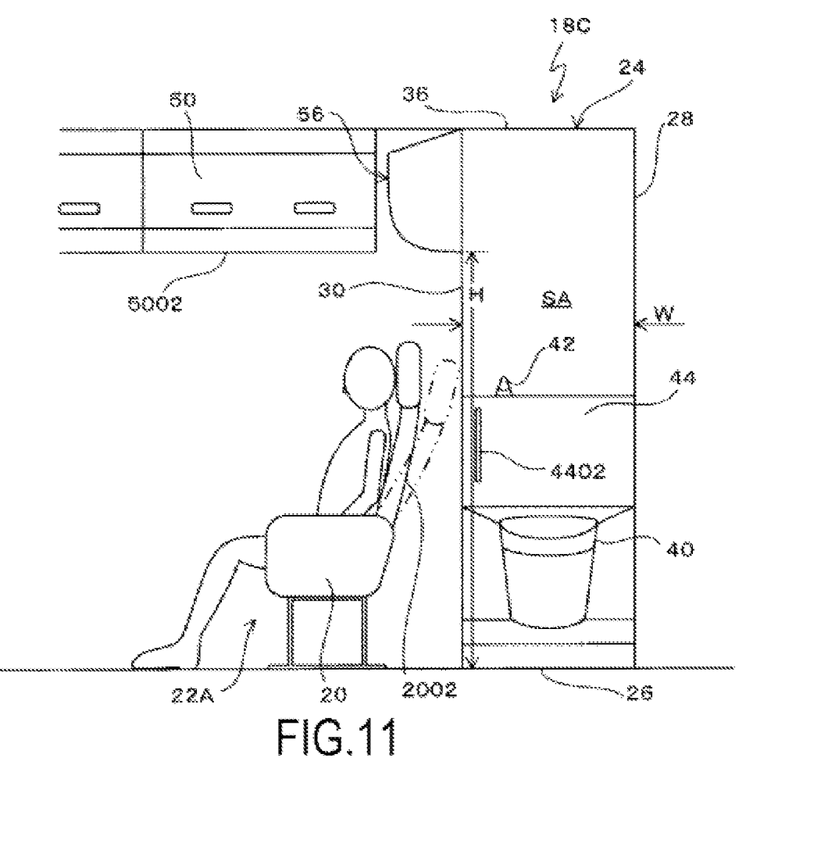
FIG. 11 is a side view showing the relationship between the aircraft lavatory unit according to the third embodiment installed within an aircraft, and a rear seat row.

Furthermore, in an arrangement structure for the aircraft lavatory unit 18C according to the third embodiment, the width W of the body frame 24 where the second side wall 30 is located is set to the minimum dimensions sufficient to ensure that the space section SA is wide enough for a person to come and go between the doorway 38 and the toilet bowl 40 and sit on the toilet bowl 40, as illustrated in FIG. 11, with the result that, when the aircraft lavatory unit 18C is disposed so that the second side wall 30 is located adjacent to the backrests 2002 of the seats 20 of the rear seat rows 22A, the aircraft lavatory unit 18C occupies very little space behind the rear seat rows 22A with respect to the longitudinal direction of the fuselage, which is advantageous in increasing the number of seats.

In addition, in the third embodiment, the aircraft lavatory unit 18C is made use of to increase the number of luggage compartments 56 in a simple manner, which is advantageous in managing passenger luggage in a simple manner.

Note that, in the present embodiments, cases in which the aircraft lavatory unit 18A, 18B or 18C is installed behind each of the rear seat rows 22A of the seat groups 12 on both the left and right sides of the longitudinal aisle 14 have been described, but the present technology also allows for cases in which the aircraft lavatory unit 18A, 18B or 18C is disposed behind the rear seat row 22A of only one of the seat groups 12, in which case the number of seats 20 can be increased by three.

In addition, the present technology may of course be applied to arrangement comprising two longitudinal aisles 14, in which case there will be three seat groups 12, and the aircraft lavatory unit 18A, 18B or 18C may be provided between the latitudinal aisle 16 and the rear seat rows 22A of at least one of the seat groups 12.

What is claimed is:

1. An aircraft lavatory unit comprising:
a body frame including:
a bottom wall having a rectangular shape as seen in plan view;
a first side wall and a second side wall rising from long sides of the bottom wall facing each other in parallel;
a rear wall rising from one short side of the bottom wall and connecting the first and second side walls at one end; and
a front wall rising from another short side of the bottom wall and connecting the first and second side walls at another end;
the second side wall rising to at least a greater height than a height of a backrest of an aircraft seat in an upright position;
a space section being formed between the first side wall and the second side wall, the space section having a uniform width and extending in a straight line from the rear wall to the front wall;
a toilet bowl and a wash basin being disposed in the space section to form a lavatory;
a doorway being disposed in the front wall;
the toilet bowl being disposed near an end in an extending direction of the space section on a side with the rear wall;
a storage box being disposed above the toilet bowl between the toilet bowl and the rear wall;

the wash basin being disposed in an upper part of the storage box; and a width of the body frame where the second side wall is located being formed at minimum dimensions sufficient to ensure that the space section is wide enough for a person to be able to come and go between the doorway and the toilet bowl and sit on the toilet bowl.

2. The aircraft lavatory unit according to claim 1, wherein the storage box has a waste receptacle and a dispenser for toilet seat covers housed therein; and the storage box is provided with a waste disposal chute leading to the waste receptacle and a dispensing mouth for the seat covers.

3. The aircraft lavatory unit according to claim 2, wherein the body frame further comprises a ceiling wall forming a ceiling of the lavatory; and the second side wall extends from the bottom wall to the ceiling wall.

4. The aircraft lavatory unit according to claim 3, wherein a cabin luggage compartment projecting in a direction away from the first side wall is provided on an upper part of the second side wall on an outer surface located on a reverse side of the space section at a location higher than the backrest of the aircraft seat in the upright position.

5. The aircraft lavatory unit according to claim 2, wherein the body frame further comprises a ceiling wall forming a ceiling of the lavatory;

the second side wall rises to a greater height than the height of the backrest of the aircraft seat in the upright position;

a projecting wall section projecting in a direction away from the first side wall and connecting the ceiling wall, the rear wall, and the front wall is provided on an upper end of the second side wall; and a storage shelf for the lavatory is formed inside the projecting wall section.

6. The aircraft lavatory unit according to claim 5, wherein the width of the body frame where the second side wall is located is from 600 mm to 750 mm.

7. An arrangement structure for the aircraft lavatory unit described in claim 6, comprising:

in a fuselage of an aircraft, a longitudinal aisle extending in a longitudinal direction of the fuselage;

seat groups having a plurality of seat rows arranged in rows along the longitudinal direction of the fuselage on left and right sides of the longitudinal aisle, the seat rows having a plurality of seats facing a front of the fuselage and arranged in rows along a latitudinal direction of the fuselage; and a latitudinal aisle extending in the latitudinal direction from boarding entrances behind the seat groups and connecting with the longitudinal aisle;

the aircraft lavatory unit being disposed so that the second side wall is disposed adjacent to a backrest of each of seats of a rear seat row located farthest to a rear in at least one of the seat groups on the left and right sides of the longitudinal aisle, the first side wall is disposed facing the latitudinal aisle, and the front wall is disposed facing the longitudinal aisle.

8. The aircraft lavatory unit according to claim 1, wherein the body frame further comprises a ceiling wall forming a ceiling of the lavatory; and the second side wall extends from the bottom wall to the ceiling wall.

9. The aircraft lavatory unit according to claim 8, wherein a cabin luggage compartment projecting in a direction away from the first side wall is provided on an upper part of the second side wall on an outer surface located on a reverse side of the space section at a location higher than the backrest of the aircraft seat in the upright position.

10. The aircraft lavatory unit according to claim 1, wherein the body frame further comprises a ceiling wall forming a ceiling of the lavatory;

the second side wall rises to a greater height than the height of the backrest of the aircraft seat in the upright position;

a projecting wall section projecting in a direction away from the first side wall and connecting the ceiling wall, the rear wall, and the front wall is provided on an upper end of the second side wall; and a storage shelf for the lavatory is formed inside the projecting wall section.

11. The aircraft lavatory unit according to claim 10, wherein the width of the body frame where the second side wall is located is from 600 mm to 750 mm.

12. The aircraft lavatory unit according to claim 1, wherein the width of the body frame where the second side wall is located is from 600 mm to 750 mm.

13. The aircraft lavatory unit according to claim 2, wherein the width of the body frame where the second side wall is located is from 600 mm to 750 mm.

14. The aircraft lavatory unit according to claim 3, wherein the width of the body frame where the second side wall is located is from 600 mm to 750 mm.

15. The aircraft lavatory unit according to claim 4, wherein the width of the body frame where the second side wall is located is from 600 mm to 750 mm.

16. An arrangement structure for the aircraft lavatory unit described in claim 1, comprising:

in a fuselage of an aircraft, a longitudinal aisle extending in a longitudinal direction of the fuselage;

seat groups having a plurality of seat rows arranged in rows along the longitudinal direction of the fuselage on left and right sides of the longitudinal aisle, the seat rows having a plurality of seats facing a front of the fuselage and arranged in rows along a latitudinal direction of the fuselage; and a latitudinal aisle extending in the latitudinal direction from boarding entrances behind the seat groups and connecting with the longitudinal aisle;

the aircraft lavatory unit being disposed so that the second side wall is disposed adjacent to a backrest of each of seats of a rear seat row located farthest to a rear in at least one of the seat groups on the left and right sides of the longitudinal aisle, the first side wall is disposed facing the latitudinal aisle, and the front wall is disposed facing the longitudinal aisle.

17. An arrangement structure for the aircraft lavatory unit described in claim 8, comprising:

in a fuselage of an aircraft, a longitudinal aisle extending in a longitudinal direction of the fuselage;

seat groups having a plurality of seat rows arranged in rows along the longitudinal direction of the fuselage on left and right sides of the longitudinal aisle, the seat rows having a plurality of seats facing a front of the fuselage and arranged in rows along a latitudinal direction of the fuselage; and a latitudinal aisle extending in the latitudinal direction from boarding entrances behind the seat groups and connecting with the longitudinal aisle;

the aircraft lavatory unit being disposed so that the second side wall is disposed adjacent to a backrest of each of seats of a rear seat row located farthest to a rear in at least one of the seat groups on the left and right sides of the longitudinal aisle, the first side wall is disposed facing the latitudinal aisle, and the front wall is disposed facing the longitudinal aisle.

18. An arrangement structure for the aircraft lavatory unit described in claim 9, comprising:
   in a fuselage of an aircraft,
   a longitudinal aisle extending in a longitudinal direction of the fuselage;
   seat groups having a plurality of seat rows arranged in rows along the longitudinal direction of the fuselage on left and right sides of the longitudinal aisle, the seat rows having a plurality of seats facing a front of the fuselage and arranged in rows along a latitudinal direction of the fuselage; and
   a latitudinal aisle extending in the latitudinal direction from boarding entrances behind the seat groups and connecting with the longitudinal aisle;
   the aircraft lavatory unit being disposed so that the second side wall is disposed adjacent to a backrest of each of seats of a rear seat row located farthest to a rear in at least one of the seat groups on the left and right sides of the longitudinal aisle, the first side wall is disposed facing the latitudinal aisle, and the front wall is disposed facing the longitudinal aisle.

19. An arrangement structure for the aircraft lavatory unit described in claim 10, comprising:
   in a fuselage of an aircraft,
   a longitudinal aisle extending in a longitudinal direction of the fuselage;
   seat groups having a plurality of seat rows arranged in rows along the longitudinal direction of the fuselage on left and right sides of the longitudinal aisle, the seat rows having a plurality of seats facing a front of the fuselage and arranged in rows along a latitudinal direction of the fuselage; and
   a latitudinal aisle extending in the latitudinal direction from boarding entrances behind the seat groups and connecting with the longitudinal aisle;
   the aircraft lavatory unit being disposed so that the second side wall is disposed adjacent to a backrest of each of seats of a rear seat row located farthest to a rear in at least one of the seat groups on the left and right sides of the longitudinal aisle, the first side wall is disposed facing the latitudinal aisle, and the front wall is disposed facing the longitudinal aisle.

20. An arrangement structure for the aircraft lavatory unit described in claim 12, comprising:
   in a fuselage of an aircraft,
   a longitudinal aisle extending in a longitudinal direction of the fuselage;
   seat groups having a plurality of seat rows arranged in rows along the longitudinal direction of the fuselage on left and right sides of the longitudinal aisle, the seat rows having a plurality of seats facing a front of the fuselage and arranged in rows along a latitudinal direction of the fuselage; and
   a latitudinal aisle extending in the latitudinal direction from boarding entrances behind the seat groups and connecting with the longitudinal aisle;
   the aircraft lavatory unit being disposed so that the second side wall is disposed adjacent to a backrest of each of seats of a rear seat row located farthest to a rear in at least one of the seat groups on the left and right sides of the longitudinal aisle, the first side wall is disposed facing the latitudinal aisle, and the front wall is disposed facing the longitudinal aisle.

\* \* \* \* \*